United States Patent [19]

Benson

[11] Patent Number: 5,284,581

[45] Date of Patent: Feb. 8, 1994

[54] PROCESSING APPARATUS WITH WALL CONDITIONING SHUTTLES

[76] Inventor: Robert A. Benson, 13 Commonwealth Ave., Boston, Mass. 02116

[21] Appl. No.: 997,283

[22] Filed: Dec. 17, 1992

[51] Int. Cl.[5] ................. B01D 29/23; B01D 35/00
[52] U.S. Cl. .................... 210/194; 210/355; 210/407; 210/413
[58] Field of Search ............. 210/241, 194, 348, 354, 210/355, 357, 391, 396, 407, 408, 413

[56] References Cited

U.S. PATENT DOCUMENTS 4,267,043  5/1981  Benson .................. 210/241
4,328,098  5/1982  Benson .................. 210/241

Primary Examiner—Stanley S. Silverman
Assistant Examiner—Robert James Popovics

[57] ABSTRACT

A processing wall is made part of a boundary of a continuous reentrant lumen, and wall conditioning runners circulate around this lumen to dislodge accumulated material from the processing wall and thereby continually restore the wall to the condition required for efficient operation.

6 Claims, 3 Drawing Sheets

PROCESSING APPARATUS WITH WALL CONDITIONING SHUTTLES

BRIEF SUMMARY OF THE INVENTION

This invention relates to processing equipment. In many processing operations critical processing steps take place at a boundary wall of equipment, and in some of these material accumulates at the boundary wall and progressively degrades the efficiency of the processing. An example is filtering equipment wherein a fluid initially bearing particulate material passes through a porous wall leaving an accumulation of cake on the wall. This cake then impedes the desired flow of fluid through the porous wall. According to the invention, a processing wall is made part of a boundary of a continuous reentrant lumen, and wall conditioning shuttles circulate around this lumen to dislodge accumulated material from the processing wall and thereby continually restore the wall to the condition required for efficient operation.

DETAILED DESCRIPTION

Figure 1:
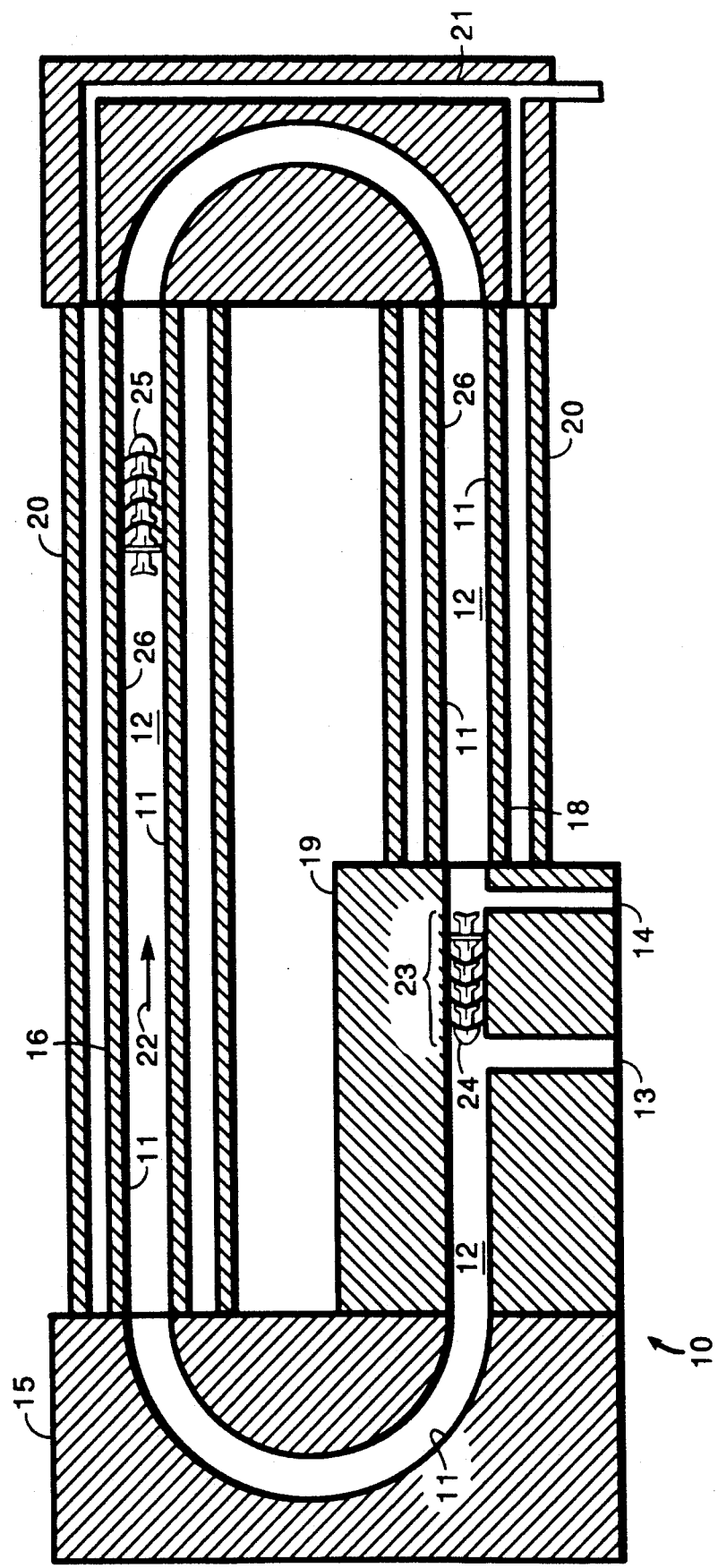
FIG. 1 shows a cross-sectional view of filtering apparatus with wall conditioning shuttles according to the invention.

With reference to the Figures, filtering apparatus 10 according to the invention includes wall 11 which defines continuous re-entrant lumen 12. Entrance port 13 communicates with lumen 12 as does exit port 14. A long path 22 through lumen 12 from entrance port 13 to exit port 14 is defined passing through turning structure 15, upper porous wall tube 16, turning structure 17, and lower porous wall tube 18. A short path 23 through lumen 12 from entrance port 13 to exit port 14 is also defined passing only through shuttle return section 19. Wall conditioning shuttles 24 and 25 are situated within lumen 12 and are free to move independently along the lumen. Filtrate containment tubes 20 capture filtrate which passes through processing wall 26, which includes porous wall tubes 16, 18. Discharge channel 21 communicates with the interior of containment tubes 20 and provides for the discharge of filtrate.

Figure 2:
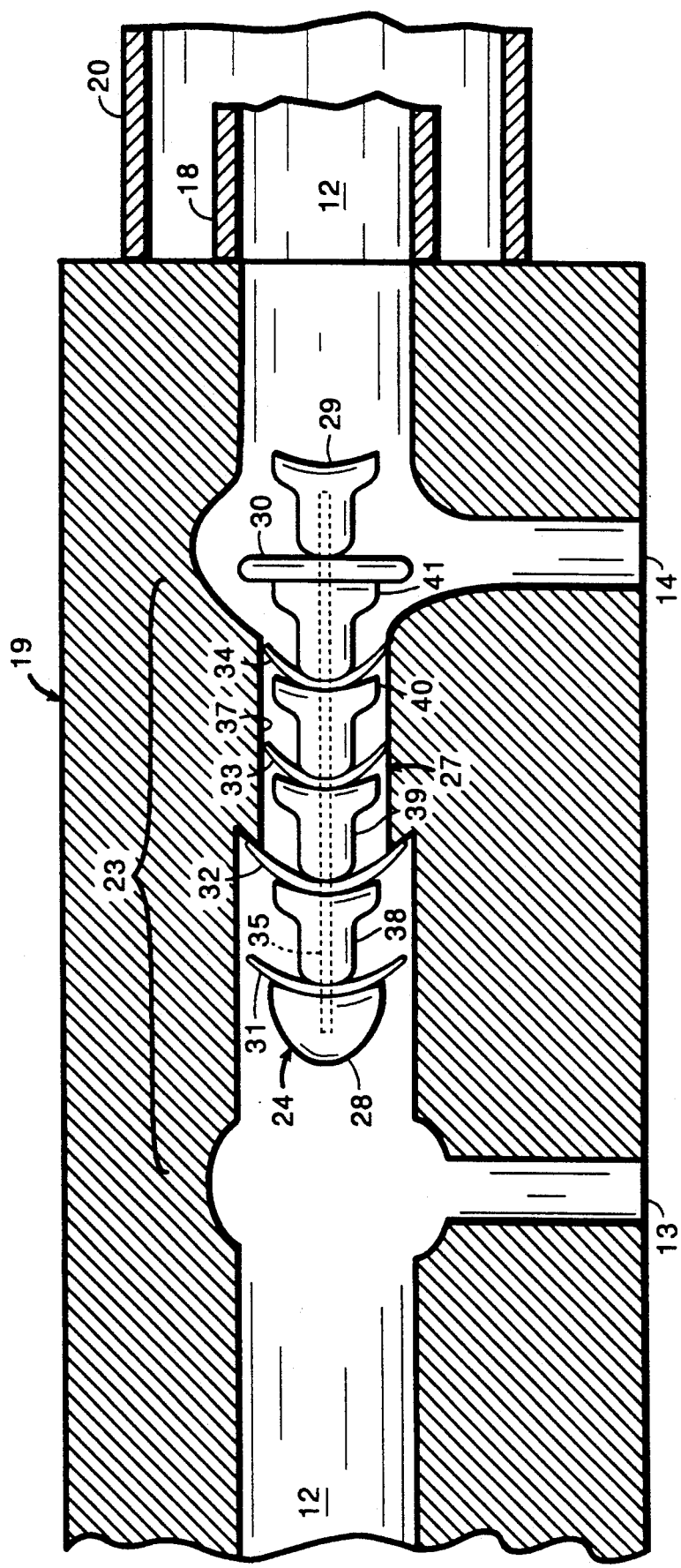
FIG. 2 shows in greater detail the shuttle return section of the apparatus of FIG. 1 with a shuttle therein.

Shuttle return section 19, as shown particularly in FIG. 2, has an inwardly projecting wall portion 37 lying between entrance port 13 and exit port 14, which provides a reduced cross section 27 in the short path of lumen 12.

Wall conditioning shuttle 24, shown in FIG. 2 lodged in short path 23 of lumen 12, includes forward bumper 28, rear bumper 29, sealing element 30, flexible vanes 31, 32, 33, 34, and beads 38, 39, 40, 41 all affixed to flexible shaft 35.

Sealing element 30 is made of elastomeric material in the form of a disk with a diameter to fill lumen 12 in long path 22. Being elastomeric, sealing element 30 can deform to assume a smaller diameter and pass through reduced section 27.

Figure 3:
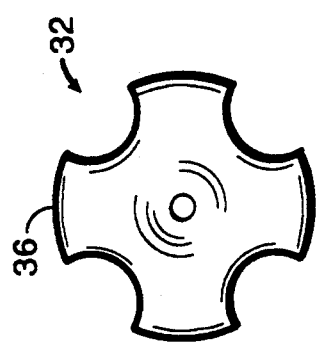
FIG. 3 shows a vane which is part of the shuttle of FIG. 2.

Vanes 31, 32, 33, 34, may advantageously be constructed of flexible polymeric sheet material cut in a shape as shown in FIG. 3.

Figure 4:
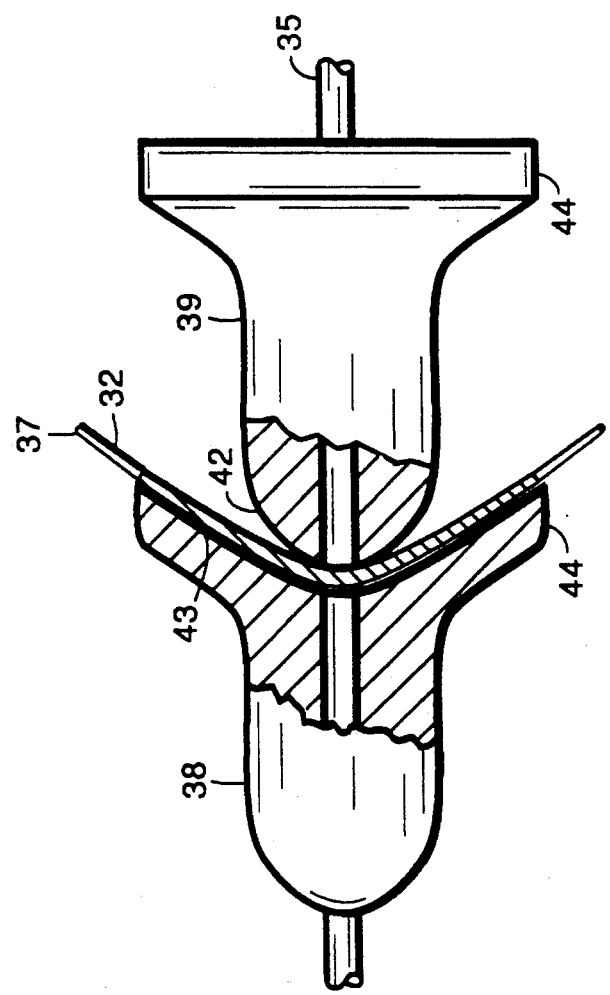
FIG. 4 shows a detail of a shuttle.

Details of assembly of exemplary vane 32 and beads 38, 39 are shown particularly in FIG. 4. Vane 32 is pinched between nose 42 of bead 39 and curved rear surface 43 of bead 38 so that vane 32 is shaped to a generally conical form. When so mounted, vane 32 extends to a distance from shaft 35 that is greater than the radius of reduced section 27 but may be readily flexed further towards bead 39 to reduce its radial extension to that of reduced section 27. Vane 32 is not, however, readily flexed toward bead 38. The vane thus in conjunction with reduced section 27 provides an anti-reverse element since it can be readily pushed into reduced section 27 from the right (as shown in FIG. 2) but cannot be readily pushed into reduced section 27 from the left. The peripheral edges 36 of vanes 31, 32, 33, and 34 closely approach processing wall 26 and provide wall conditioning elements to dislodge accumulated material from the processing wall of the lumen.

Each of beads 38, 39, 40, 41 has a rear flange 44 with a diameter to fit with small clearance in reduced section 27. The flange provides, when in reduced section 27, a plug preventing flow through short path 23.

The operation of the apparatus is cyclical and it is convenient to start the description of the activity when one shuttle is as shown in FIG. 2 positioned in the short path 23 of return section 19 with flange 44 lodged in the reduced cross-section 27 of the lumen. Flange 44 acts as a plug blocking flow of fluid through short path 23, so that fluid entering at entrance port 13 flows around long path 22 to exit port 14. Although the pressure at entrance port 13 is greater than at exit port 14, vane 32 is expanded to a diameter greater than that of reduced cross-section 27 and resists movement of the shuttle 24 to the right (as portrayed in FIG. 2). As the fluid, which is bearing dispersed particulate material, passes in contact with the processing wall of porous material, some of the fluid filters through the wall leaving an accumulation of filter cake on the wall. At this time the other shuttle 25 is being carried by the flow of the fluid around long path 22. As shuttle 25 moves around long path 22, the edges of its vanes closely approach or touch processing wall 26 to dislodge filter cake which is accumulating.

As the circulating shuttle completes its journey through long path 22 it approaches and then hits with its forward bumper the rear bumper of the shuttle lodged in short path 23. This results in ejecting the lodged shuttle into the long path of the lumen (i.e., to the left of port 13 as shown in FIG. 2), and lodging the previously free running shuttle in the short path in shuttle return section 19. As the rear shuttle enters the short path, the vanes 31, 32, 33, 34 deform to accommodate to reduced cross-section 27 and then, after passing through the reduced cross-section, expand and provide a lock against reverse motion of the shuttle. The newly freed shuttle now circulates through the long path to condition the processing wall while the newly lodged shuttle blocks flow through the short path. The operation continues with the two shuttles taking turns in blocking the short path and in passing through the long path to condition the processing wall.

Apparatus according to the invention can be adapted to a wide range of processing operations by appropriate choice of apparatus dimensions and especially of the material and structure of the wall conditioning elements to take account of the properties of the processing wall and of the material accumulating thereon. Advantageous specifications for filtering pond water containing algae to produce clear water are as follows.

Entering flow rate: 15 gal per min.
Inside diameter of filter tube: 1 in.
Total length of filtering tubes: 5 ft.
Distance between exit and entrance ports: 3.4 in.
Length of shuttle: 3.5 in.
Diameter of reduced section: 0.75 in.

I claim:

1. Processing apparatus comprising
structure defining a continuous re-entrant lumen, said lumen having a wall
an entrance port communicating with said lumen and an exit port communicating with said lumen, said ports being disposed asymmetrically around the length of the lumen so that a first path and a second path from the entrance port to the exit port through the lumen are defined, said first path being longer than said second path,
a shuttle return section situated around said second path,
said lumen wall including processing wall on which material accumulates during operation of said apparatus, said processing wall being situated along said first path,
at least two wall conditioning shuttles situated within the lumen and unconnected to each other and to the lumen wall, each of said shuttles comprising
a forward bumper,
a rear bumper,
a wall conditioning element effective when the shuttle passes through said first path to dislodge accumulated material from said lumen wall,
a plug effective when the shuttle is in said second path of said lumen in blocking said second path from flow therethrough.

2. Apparatus as claimed in claim 1, wherein said shuttles include an anti-reverse element which, when the shuttle is in the second path of the lumen, interact with the wall to permit motion of the shuttle in the direction from the exit port towards the entrance port while resisting motion of the shuttle in the direction from the entrance port towards the exit port.

3. Apparatus as claimed in claim 1, wherein said lumen has a reduced cross section in said second path.

4. Apparatus as claimed in claim 3, wherein said shuttles include vanes made of flexible sheet material which extend to a radius greater than that of said reduced cross section, said vanes being readily deformable to enter said reduced cross section from the direction from said exit port and resisting deformation to enter said reduced cross section from the direction of said entrance port.

5. Apparatus as claimed in claim 1, wherein each of said shuttles includes a sealing element which, when said shuttle is moving through said first path, obstructs flow of fluid past said shuttle.

6. Processing apparatus as claimed in claim 1, wherein said processing apparatus is filtering apparatus and wherein which said processing wall is porous.

* * * * *